US012623970B2

(12) United States Patent
Afaneh et al.

(10) Patent No.: US 12,623,970 B2
(45) Date of Patent: May 12, 2026

(54) DURABLE HIGH FRICTION COATING (DHFC) FOR BRAKE APPLICATION

(71) Applicant: WOLVERINE ADVANCED MATERIALS, LLC, Dearborn, MI (US)

(72) Inventors: Abdul-Hafiz Afaneh, Dearborn, MI (US); Francesco Mancina, Dearborn, MI (US); Abed Hasheminasab, Dearborn, MI (US)

(73) Assignee: WOLVERINE ADVANCED MATERIALS, LLC, Dearborn, MI (US)

( * ) Notice: Subject to any disclaimer, the term of this patent is extended or adjusted under 35 U.S.C. 154(b) by 854 days.

(21) Appl. No.: 17/909,467

(22) PCT Filed: Feb. 1, 2021

(86) PCT No.: PCT/US2021/016013
§ 371 (c)(1),
(2) Date: Sep. 6, 2022

(87) PCT Pub. No.: WO2021/221746
PCT Pub. Date: Nov. 4, 2021

(65) Prior Publication Data
US 2023/0116712 A1     Apr. 13, 2023

Related U.S. Application Data

(60) Provisional application No. 63/017,696, filed on Apr. 30, 2020.

(51) Int. Cl.
*C04B 35/10* (2006.01)
*C04B 35/46* (2006.01)
*C04B 35/74* (2006.01)

(52) U.S. Cl.
CPC .............. *C04B 35/10* (2013.01); *C04B 35/46* (2013.01); *C04B 35/74* (2013.01); *Y10T 428/24967* (2015.01)

(58) Field of Classification Search
CPC ......... C04B 35/10; C04B 35/46; C04B 35/74; Y10T 428/24967
See application file for complete search history.

(56) References Cited

U.S. PATENT DOCUMENTS 3,837,984 A     9/1974   Wagner et al.
4,452,927 A     6/1984   Matsushima et al.
(Continued)

OTHER PUBLICATIONS

International Search Report and Written Opinion for PCT Application No. PCT/US21/16013 mailed Apr. 23, 2021.

*Primary Examiner* — Donald M Flores, Jr.
(74) *Attorney, Agent, or Firm* — Honigman LLP

(57)     ABSTRACT

Technologies are described for a durable high friction coating (DHFC), which may be manufactured by mixing a binder, a filler, and one or more additives in liquid form, loading the liquid mixture onto a coil material (metal substrate) and curing for subsequent cutting and/or stamping. The metal substrate with cured DHFC layer(s) may be cut to shape to form brake shims. Water-based binders may be used for environmentally friendly chemicals. In some examples, the binder(s) in the DHFC may be in a range from at least 70 weight % to less than 95 weight % and the filler(s) in a range from at least 5 weight % to less than 30 weight % with an elastomeric polymer in a range from at least 1 weight % to less than 8 weight % and a rheology modifier in a range from at least 0.5 weight % to less than 2 weight %.

18 Claims, 10 Drawing Sheets

(56) References Cited

U.S. PATENT DOCUMENTS

| 5,427,332 | A | | 6/1995 | Rauckhorst, III et al. |
| 5,622,785 | A | | 4/1997 | Gaylor et al. |
| 5,971,113 | A | * | 10/1999 | Kesavan ................. F16D 69/02 |
| | | | | 188/251 A |
| 6,524,681 | B1 | | 2/2003 | Seitz et al. |
| 8,603,206 | B2 | | 12/2013 | Cai |
| 9,085,710 | B2 | * | 7/2015 | Hachikian ............ C09D 163/00 |
| 9,441,687 | B2 | | 9/2016 | Afaneh et al. |
| 2005/0263658 | A1 | | 12/2005 | Fontana et al. |
| 2013/0240306 | A1 | * | 9/2013 | Murphy ............. F16D 65/0006 |
| | | | | 72/46 |

* cited by examiner

200

202

206

208

210

204

800

802
MIX BINDER FILLER AND ADDITIVE(S) IN LIQUID FORM

804
PUMP MIXTURE INTO COATING BOX

806
LOAD MIXTURE ONTO COIL MATERIAL CUTTING WITH BLADE

808
CURE MIXTURE INTO DHFC LAYER ON SHIM SUBSTRATE

810
CUT DHFC LAYERED SHIM

DURABLE HIGH FRICTION COATING (DHFC) FOR BRAKE APPLICATION

CROSS-REFERENCE TO RELATED APPLICATIONS

This application is a U.S. National Stage filing under 35 U.S.C. § 371 of International Application PCT/US21/16013, filed Feb. 1, 2021, which claims the benefit of U.S. Provisional Patent Application Ser. No. 63/017,696 filed on Apr. 30, 2020. The disclosures of the above applications are hereby incorporated by references for all purposes.

BACKGROUND

Unless otherwise indicated herein, the materials described in this section are not prior art to the claims in this application and are not admitted as prior art by inclusion in this section.

High friction coatings provide improved coupling between moving parts of a machine. Vehicles include brake discs for slowing the motion of the vehicle. These brake discs include a rotor that is affixed to a wheel of the vehicle. The brake disc rotor and the wheel are carried on a shaft, where the brake disc rotor rotates along with the wheel as it rotates. The brake disc rotor is disposed between a pair of calipers having brake pads mounted thereon. The brake pads are arranged to selectively engage the brake disc rotor to affect braking of the vehicle. In operation, pressure, such as hydraulic pressure, may be applied to the calipers, urging the calipers together until the brake disc rotor is squeezed under pressure between the pads, resulting in slowing or stopping of the vehicle. Abutment clips, which reside on a caliper bracket, create uniform surface for the brake pads. The abutment clips guide the brake pads to slide back and forth toward to the rotor. The sliding mechanism formed by the abutment clips may cause noise and vibration during the brake pad sliding.

SUMMARY

According to some examples, a durable high friction coating (DHFC) for a brake system is described. The DHFC may include one or more binders in a range from at least 70 weight % to less than 95 weight %; one or more fillers in a range from at least 5 weight % to less than 30 weight %; an elastomeric polymer in a range from at least 1 weight % to less than 8 weight %; and one or more additives in a range from at least 0.5 weight % to less than 2 weight %, where the one or more binders, fillers, additives, and the elastomeric polymer are mixed in liquid form and are cured into a layer of DHFC.

According to other examples, the one or more binders may include phenoxy in dry form, phenoxy in aqueous solution, polyurethane in dry form, polyurethane in aqueous solution form, melamine formaldehyde, bisphenol A epoxy, urea-formaldehyde, acrylate copolymer, or a combination thereof. The one or more fillers may include silicon carbide, (SiC), aluminum oxide ($Al_2O_3$), boron nitride (BN), titanium dioxide ($TiO_2$), or a combination thereof. The one or more additives may include a rheology modifier, an antifoam agent, a plasticizer, a pigment, an adhesion promoter, or a combination thereof. A thickness of the layer of DHFC may be in a range from about 0.020 mm to about 0.060 mm. The layer of DHFC may be formed on a layer of elastomer and the layer of DHFC and the layer of elastomer are cured together. The layer of elastomer may include synthetic polyisoprene, polybutadiene, chloroprene rubber, polychloroprene, neoprene, butyl rubber, halogenated butyl rubber, styrene-butadiene rubber, nitrile rubber, hydrogenated nitrile rubber, or a combination thereof. The elastomeric polymer may include synthetic polyisoprene, polybutadiene, polychloroprene, neoprene, or a combination thereof.

According to further examples, a brake shim may include a metal substrate; a first durable high friction coating (DHFC) layer deposited on a first surface of the metal substrate; and a second DHFC layer or an adhesive layer deposited on a second surface of the metal substrate opposite the first surface. The first and second DHFC layers may include one or more binders in a range from at least 70 weight % to less than 95 weight %; one or more fillers in a range from at least 5 weight % to less than 30 weight %; an elastomeric polymer in a range from at least 1 weight % to less than 8 weight %; and one or more additives in a range from at least 0.5 weight % to less than 2 weight %, where the one or more binders, fillers, additives, and the elastomeric polymer are mixed in liquid form and are cured into a layer of DHFC.

According to some examples, a thickness of the metal substrate may be in a range from about 0.350 mm to about 0.400 mm, and a thickness of the layer of DHFC may be in a range from about 0.020 mm to about 0.060 mm. The metal substrate may include stainless steel, nickel, nickel-aluminum alloy, iron-nickel-chromium-molybdenum alloy, or a combination thereof. The brake shim may also include an elastomer layer deposited on the first surface or the second surface prior to deposition of the first or second DHFC layers, where the first or second DHFC layers are deposited onto the elastomer layer. The first or second DHFC layers and the elastomer layer may be cured together. The metal substrate and cured the first or second DHFC layers may be cut to shape to form the brake shim. The one or more binders may include phenoxy in dry form, phenoxy in aqueous solution, polyurethane in dry form, polyurethane in aqueous solution form, melamine formaldehyde, bisphenol A epoxy, urea-formaldehyde, acrylate copolymer, or a combination thereof. The one or more fillers may include silicon carbide, (SiC), aluminum oxide ($Al_2O_3$), boron nitride (BN), titanium dioxide ($TiO_2$), or a combination thereof.

According to other examples, a method to manufacture a durable high friction coating (DHFC) for a brake system is described. The method may include mixing a binder, a filler, an elastomeric polymer, and an additive in liquid form to form a mixture, where the binder is in a range from at least 70 weight % to less than 95 weight %, the filler in a range from at least 5 weight % to less than 30 weight %, the elastomeric polymer is in a range from at least 1 weight % to less than 8 weight %, and the additive is in a range from at least 0.5 weight % to less than 2 weight % in the mixture; loading the mixture onto a coil material to form a layer of DHFC; and curing the layer of DHFC on the coil material through heat treatment.

According to further examples, mixing the binder, the filler, the elastomeric polymer, and the additive in liquid form may include mixing in a water-based media: the binder selected from phenoxy, polyurethane, melamine formaldehyde, bisphenol A epoxy, urea-formaldehyde, acrylate copolymer, or a combination thereof; the filler selected from silicon carbide, (SiC), aluminum oxide ($Al_2O_3$), boron nitride (BN), titanium dioxide ($TiO_2$), or a combination thereof; the elastomeric polymer; and the additive selected from a rheology modifier, an antifoam agent, a plasticizer, a pigment, an adhesion promoter, or a combination thereof. Loading the mixture onto the coil material to form the layer of DHFC may include loading the mixture onto the coil material using a blade or rolling the mixture onto the coil material using one or more rollers. Curing the layer of DHFC through heat treatment may include applying heated air, direct heat, or infrared heat to the layer of DHFC.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
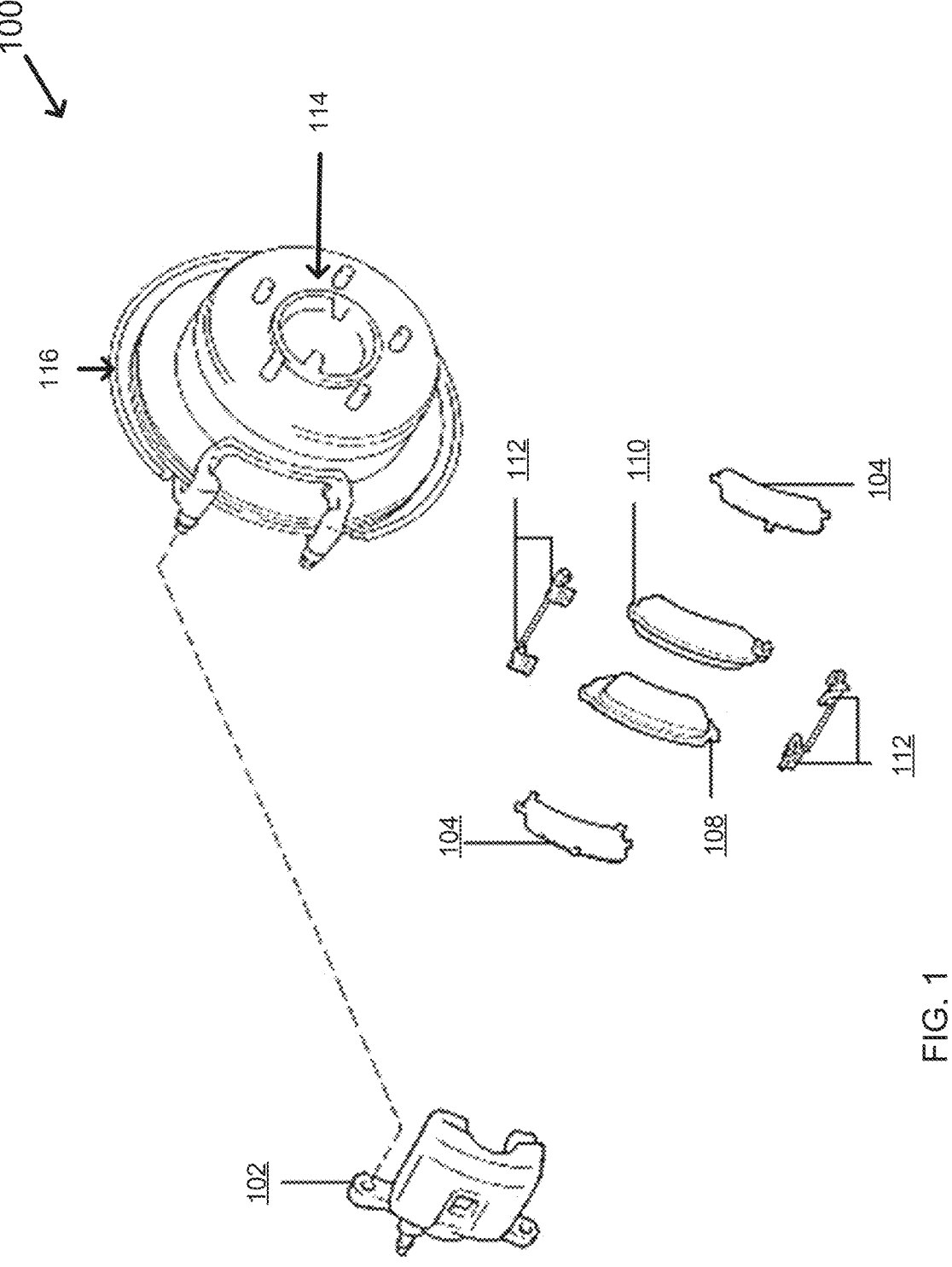
FIG. 1 illustrates an example brake disc assembly having a brake disc rotor and corresponding pair of brake pads.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to durable high friction coatings (DHFCs) for brake applications, coated brake disc parts, and methods to produce DHFCs.

Briefly stated, a durable high friction coating (DHFC) may be manufactured by mixing a binder, a filler, and one or more additives in liquid form, loading the liquid mixture onto a coil material (metal substrate) and curing for subsequent cutting and/or stamping. The metal substrate with cured DHFC layer(s) may be cut to shape to form brake shims. Water-based binders may be used for environmentally friendly chemicals. In some examples, the binder(s) in the DHFC may be in a range from at least 70 weight % to less than 95 weight % and the filler(s) in a range from at least 5 weight % to less than 30 weight % with an elastomeric polymer in a range from at least 1 weight % to less than 8 weight % and a rheology modifier in a range from at least 0.5 weight % to less than 2 weight %.

A DHFC layer according to examples may be applicable onto both on elastomer and metal layers (substrate). The DHFC is durable enough to be used in the brake insulators (shims) in automotive brake systems and have a high coefficient of friction. In addition, through the use of water-based binders, the coating may be environmentally friendly. The coating may lend itself to an easy and affordable production (e.g., transfer, mixing, and curing steps). It may also be applicable for blade cutting or roll/coil coating processes. A liquid form DHFC material (pre-cure) may have an expected shelf life of about 6-12 months. The expected life may be about 3-5 years on RCM cured materials.

Elastomer (rubber) coated materials (RCM) have been used for making shims. These parts reduce or eliminate the noises and vibration characteristics of some vehicles brake system. The DHFC coated on nitrile rubber (NBR) provides coupling effect between pad and caliper and can reduce the vibration of the pad via energy dissipation and or changing the system eigenvalues. Compatibility with rubber provides the formation of Durable High Friction Elastomer Coating (DHFEC). A coating according to examples may be used in the brake insulators (shims) where the maximum force is experienced by piston and caliper fingers. Therefore, the coating has a high coefficient of friction (COF) and durability to create a coupling between pads and caliper. The example coating is a one-part system as opposed to 2- or more part systems, which provides a long shelf life (e.g., 6-8 months) compared to the mere hours of post-mixing shelf life for multi-part systems. The older versions (almost 3 hrs.). By adjusting types and volumetric ratios of the binders and fillers, the COF may be adjusted as needed in different brake systems.

By eliminating or minimizing the organic volatile content (VOC) in water-based systems, an environmentally friendly material may be achieved. By controlling the heat-based curing and coil and roller or blade coating processes, the wet and dry film thickness may be easily controlled. Because of the cured layer end product, shims may be formed with the cured DHFC layer or easily stamped and produced from the DHFC coated material without further post-treatment.

FIG. 1 illustrates an example brake disc assembly having a brake disc rotor and corresponding pair of brake pads arranged according to aspects of the present disclosure. The example brake disc assembly 100 includes a caliper 102, a pair of brake shims 104, an inner brake pad 108, an outer brake pad 110, abutment clips 112, a hub 114, and a brake disc rotor 116.

The hub 114 may be mounted on an axle (not shown). The brake disc rotor 116 has a disc shape and is a part of the hub 114. The brake disc rotor 116 is configured to rotate along with the hub 114 through the axle. When pressure is applied to a brake pedal of a vehicle, various systems in the vehicle will responsively actuate the caliper 102 to urge the surface of the inner and outer brake pads against a surface of the brake disc rotor 116, thus bringing the vehicle to a halt. The abutment clips 112 guide the brake pads to slide back and forth toward to the rotor.

A high friction coating may be applied on the surface(s) of the shims 104 to reduce noise and vibration that may occur during brake application. The DHFC may be applied directly to the metal substrate of the shims 104, or it may be applied onto an elastomer layer applied to the metal substrate of the shims 104. The DHFC may be composed of water- or solvent-based binder in a range from at least 70 weight % to less than 95 weight %, a filler in a range from at least 1 weight % to less than 15 weight %, and an additive in a range from at least 0.2 weight % to less than 5 weight %. The DHFC may be formed in liquid form, cured as a layer directly on the shim substrate or cured and stamped onto the substrate. Through its high COF and durability, the DHFC layer creates a coupling between pads and caliper.

Figure 2:
FIG. 2 illustrates an example brake shim with an adhesive layer on one surface and a durable high friction coating (DHFC) layer on an opposing surface.
Figure 2:
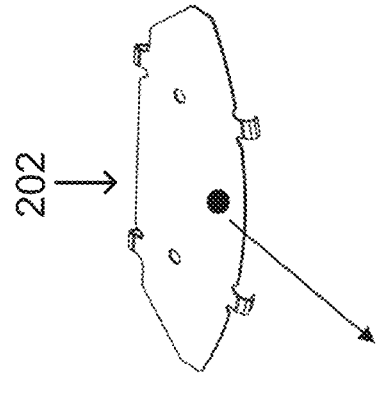
Figure 2:
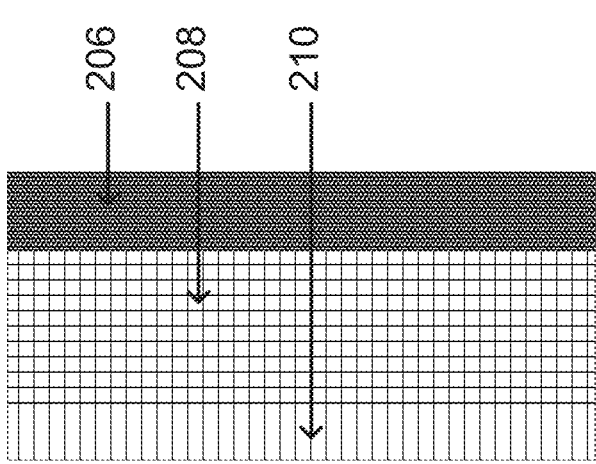

FIG. 2 illustrates an example brake shim with an adhesive layer on one surface and a durable high friction coating (DHFC) layer on an opposing surface, arranged according to aspects of the present disclosure. As shown in diagram 200, a surface of brake shim 202 may be coated with a DHFC layer. In some examples, the shim may be formed by coating a metal substrate layer 208 with a DHFC layer 206 and curing the DHFC layer. An opposing surface of the metal substrate layer 208 may be coated with an adhesive layer 210 to affix the shim to the brake assembly (e.g., brake pad). Thus, the cross section 204 of the shim 202 may include DHFC layer 206, metal substrate layer 208, and adhesive layer 210.

Figure 3:
FIG. 3 illustrates an example brake shim with durable high friction coating (DHFC) layers on opposing surfaces.
Figure 3:
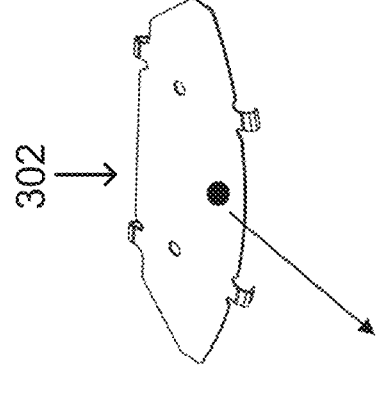
Figure 3:
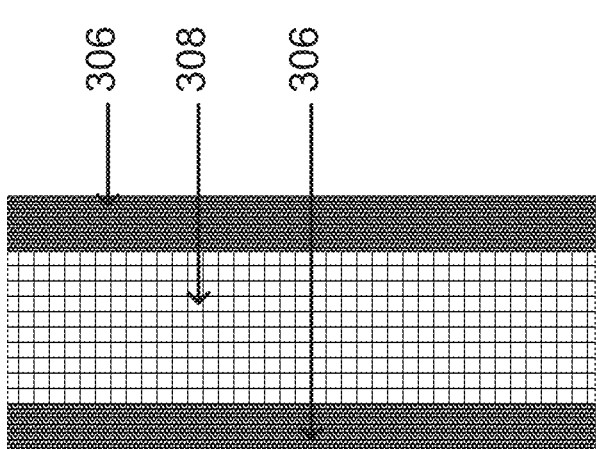
Figure 3:

FIG. 3 illustrates another example brake shim with durable high friction coating (DHFC) layers on opposing surfaces, arranged according to aspects of the present disclosure. As shown in diagram 300, both surfaces of brake shim 302 may be coated with a DHFC layer as well. In some examples, the shim may be formed by coating a metal substrate layer 308 with a DHFC layer 306 on opposing surfaces and curing the DHFC layers 306. Thus, the cross section 304 of the shim 302 may include DHFC layer 306, metal substrate layer 308, and second adhesive layer 306.

The metal substrate may include stainless steel, nickel, nickel-aluminum alloy, iron-nickel-chromium-molybdenum alloy, or similar metal materials. In some examples, the DHFC layer(s) may be deposed on elastomer as well. The DHFC coated on elastomer may provide coupling effect between pad and caliper and reduce the vibration of the pad via energy dissipation and or changing the system eigenvalues. Compatibility with rubber provides the formation of durable high friction elastomer coating (DHFEC). Elastomer may include a polymer with viscoelasticity (i.e., both viscosity and elasticity) and weak intermolecular forces. Examples of elastomer that may be used in the elastomer layers may include, but are not limited to, synthetic polyisoprene, polybutadiene, chloroprene rubber, polychloroprene, neoprene, butyl rubber (copolymer of isobutylene and isoprene), halogenated butyl rubbers (chloro-butyl rubber, bromo-butyl rubber), styrene-butadiene rubber, nitrile rubber (NBR), and/or hydrogenated nitrile rubbers. The DHFC may be composed of one or more binders in a range from at least 70 weight % to less than 95 weight %, one or more fillers in a range from at least 5 weight % to less than 30 weight %, an elastomeric polymer in a range from at least 1 weight % to less than 8 weight %, and a rheology modifier in a range from at least 0.5 weight % to less than 2 weight %.

In some examples, the binder(s) in the DHFC layer may include, but are not limited to, phenoxy (in dry or aqueous solution form), polyurethane (in dry or aqueous solution form), melamine formaldehyde, bisphenol A epoxy, urea-formaldehyde, acrylate copolymer, and/or combinations thereof. The filler(s) in the DHFC layer may include, but are not limited to, silicon carbide, (SiC), aluminum oxide ($Al_2O_3$), boron nitride (BN), titanium dioxide ($TiO_2$), and/or combinations thereof. The additives in the DHFC layer (other than elastomer polymer) may include, but are not limited to, antifoam agents, plasticizers, pigments, rheology modifiers, adhesion promoters (e.g. silanes, titanates, etc.), and/or combinations thereof. It should be noted that the DHFC layers may be produced by combining one or more of any of binders, fillers, and additives listed above or similar materials. For example, phenoxy as binder may be combined with two (or more) fillers and three or more additives. Similarly, two binders may be combined with one filler, etc.

According to some examples, a thickness of the DHFC layer 202 may be in a range from about 0.020 mm to about 0.60 mm and a thickness of the metal substrate may be in a range from about 0.350 mm to about 0.400 mm. As discussed above, coated metal substrate may be used as shim, where the shim may be formed from the metal substrate and the DHFC (or DHFEC) layer(s) stamped onto the metal substrate. Alternatively, the DHFC (or DHFEC) layer(s) may be applied and cured on the metal substrate, which may then be cut to shape to form shims.

Figure 4A:
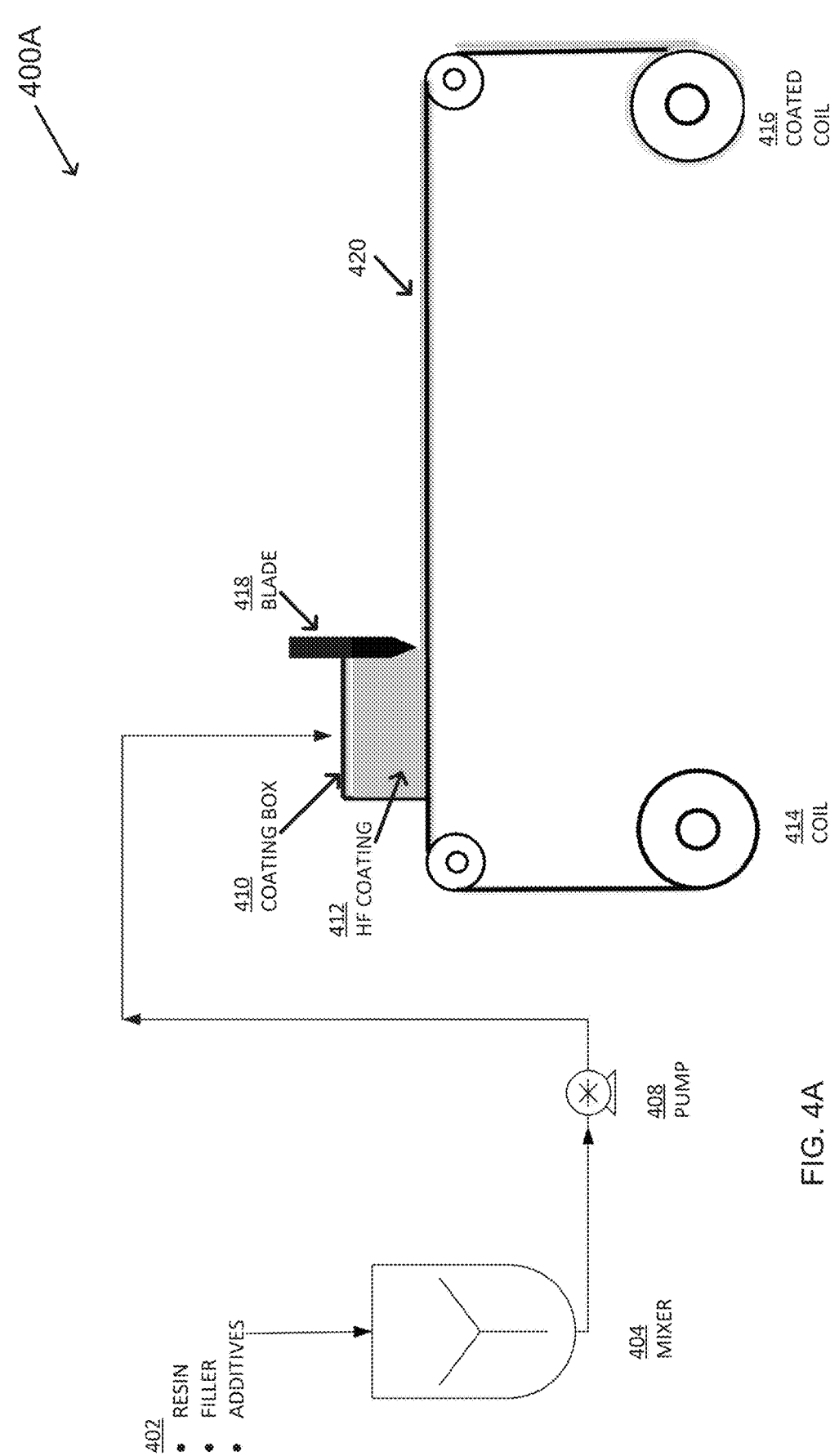
FIGS. 4A and 4B illustrate two example systems for manufacturing example DHFC.
Figure 4B:
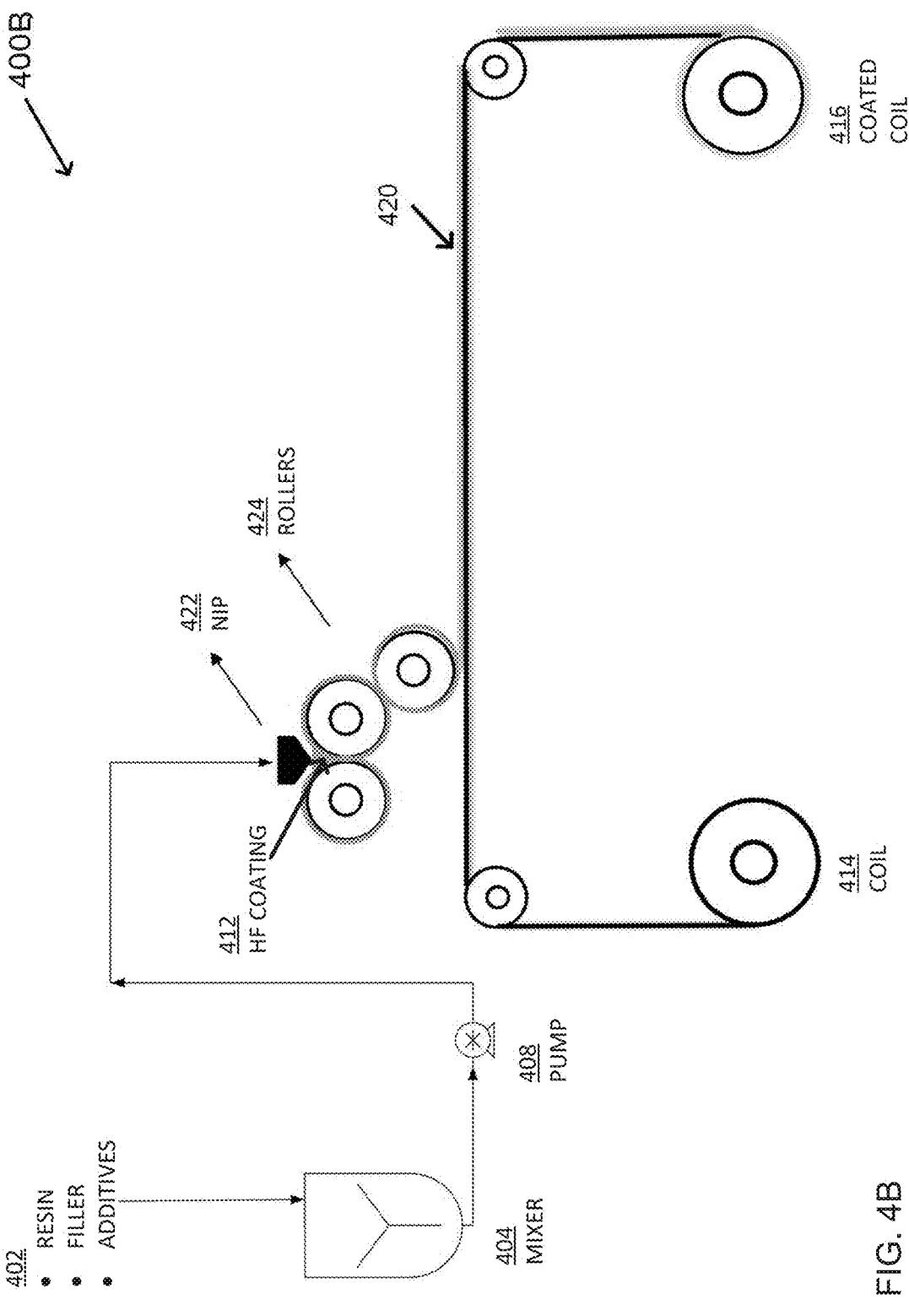

FIGS. 4A and 4B illustrate two example systems for manufacturing example DHFC, arranged according to aspects of the present disclosure.

As shown in diagram 400A, an example system may include a mixer 404 to mix the binder(s), filler(s), additives and solvents 402, a pump 408 to provide the liquid mixture (HF coating 412) to the coating box 410, a blade 418 to cut the viscous liquid mixture as it flows onto a rolling coil material 414, and the mixture is cured as a layer 420 on the coil material 414 resulting in the coated coil material 416. The blade 418 may allow thicker layers of DHFC.

As shown in diagram 400B, an example system may include a mixer 404 to mix the binder(s), filler(s), additives and solvents 402, a pump 408 to provide the liquid mixture to the rollers 424, a nip 422 to catch the liquid mixture (HF coating 412) and provide to rollers 412, which coat a rolling coil material 414 with the HF coating 412, and the mixture is cured as a layer 420 on the coil material 414 resulting in the coated coil material 416.

A DHFC (or DHFEC) according to examples is a one-part system easy to mix and compatible with NBR and most elastomer substrates and metal surfaces. The system is a thermoset system providing ease (and low cost) of manufacturing for the curing process. The system is applicable for roller and blade coating. During the manufacturing process, wet and dry film thickness up to 50 micrometers may be easy to control. Components made from DHFEC coated materials help reduce vibration in the brake system by increasing the coupling between pads and caliper.

In an example operation, one or more binders, for example, phenoxy (in dry or aqueous solution form), polyurethane (in dry or aqueous solution form), melamine formaldehyde, bisphenol A epoxy, urea-formaldehyde, acrylate copolymer, and/or combinations thereof; one or more fillers, for example, silicon carbide, (SiC), aluminum oxide ($Al_2O_3$), boron nitride (BN), nano-silica, titanium dioxide ($TiO_2$), and/or combinations thereof; an elastomer polymer; and additives such as rheology modifiers, antifoam agents, pigments, plasticizers, adhesion promoters (e.g. silanes, titanates, etc.), and/or combinations thereof, may be mixed in mixer 404. As mentioned above, combinations of multiple materials such as two binders and three fillers, one binder and two fillers, etc. may be mixed too. The final mixture may be provided by a pump 408 to the rollers 424 or coating box 410, which may apply the mixture as a layer onto coil material 414. The layer of DHFEC may be cured through thermal treatment such as hot air, infrared light, convection heating, or other thermal mechanisms.

The coil material 414 may be a metal substrate that forms the metal of the shim. Thus, the cured layer of DHFEC on the metal substrate may be cut to shape to form a shim. In some example, DHFEC layers may be applied to both surfaces of the metal substrate. In other examples, the DHFEC layer may be applied to one surface and an adhesive layer may be applied (subsequent to curing) to the other surface of the metal substrate.

Figure 5:
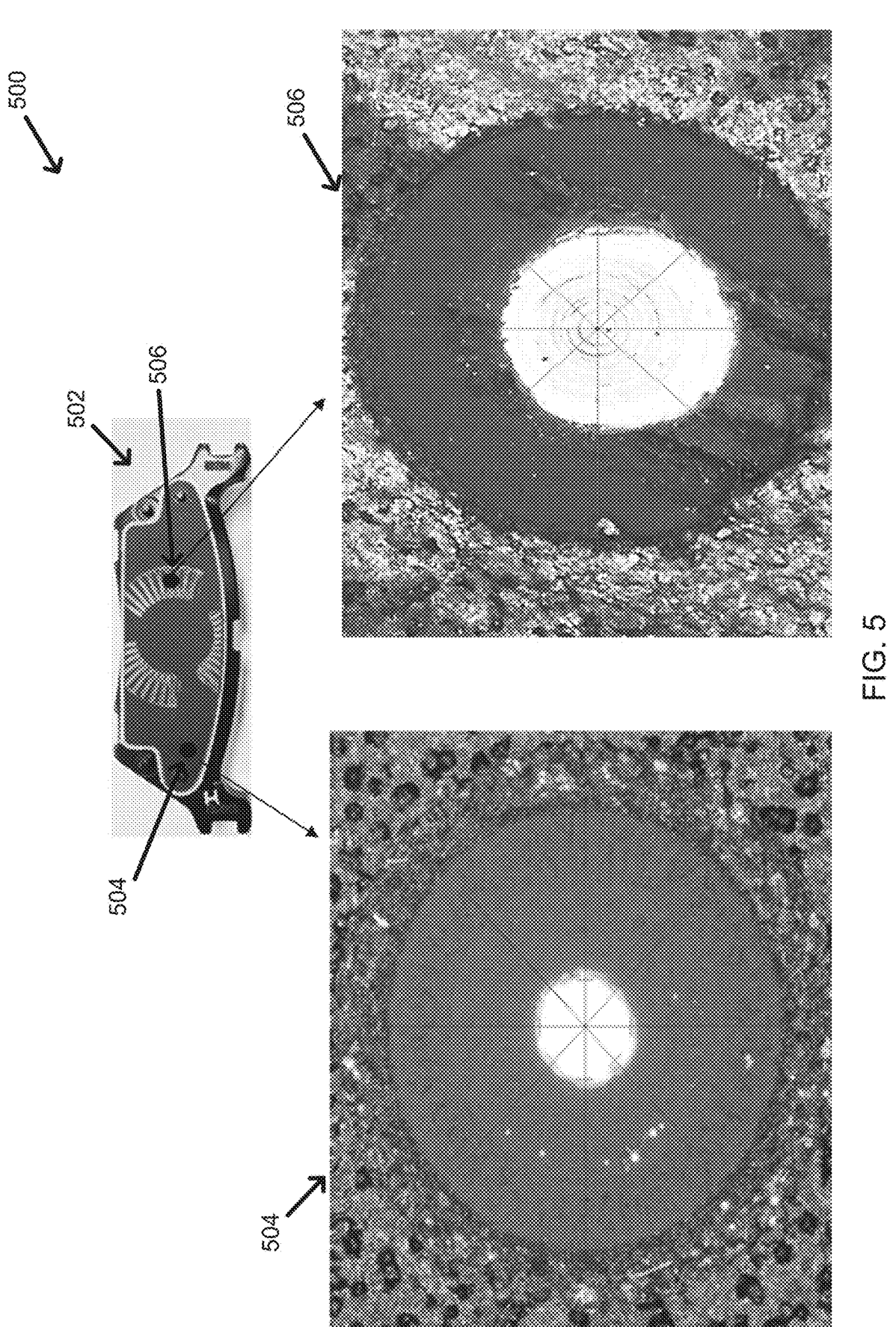
FIG. 5 illustrates example results of brake application tests on a DHFC treated shim surface after 30,000 simulated brake stops.

FIG. 5 illustrates example results of brake application tests on a DHFC treated shim surface after 30,000 simulated brake stops, arranged according to aspects of the present disclosure.

Diagram 500 shows a picture of a DFHC treated surface of a shim 502 with two areas, a non-piston-contact area 504 and a piston-contact area 506 highlighted. Diagram 500 also includes close up pictures of the non-piston-contact area 504 and the piston-contact area 506. As the picture of the non-piston-contact area 504 shows, a thickness of the DHFC layer without piston abrasion is 33.93 micrometers. In the piston-contact area 506, the thickness of the DHFC layer is reduced to 14.5 micrometers after 30,000 brake applications.

Figure 6:
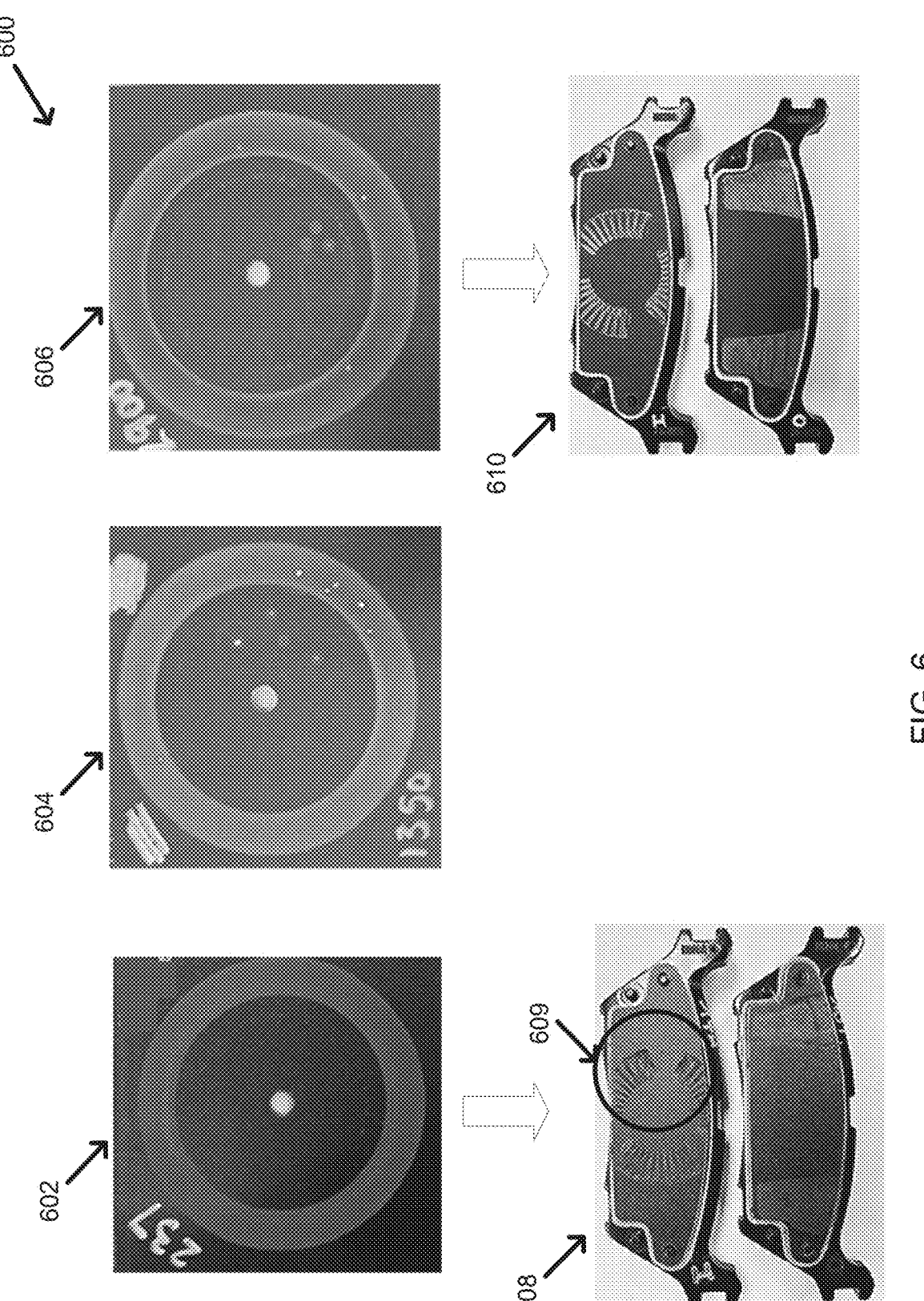
FIG. 6 illustrates example result of Taber abrasion tests on DHFC treated brake shim surfaces.

FIG. 6 illustrates example result of Taber abrasion tests on DHFC treated brake shim surfaces, arranged according to aspects of the present disclosure.

Diagram 600 includes pictures of a test disc after bond failure has been detected following a number of test cycles. Picture 602 includes a test disc of a conventional friction layer material, which reached bond failure after 237 test cycles. Picture 604 includes a test disc with DHFC material according to examples, which reached bond failure after 1350 test cycles. Picture 606 includes a test disc with DHFEC material (high friction material and elastomer) according to examples, which reached bond failure after 2900 test cycles.

Taber abrasion is a test to determine a material's resistance to abrasion. Resistance to abrasion is defined as the ability of the material to withstand mechanical action such as rubbing, scraping, or erosion. Three forms of abrasion occur and are tested for, namely flat (plane or surface) abrasion, edge abrasion (i.e. at collars and folds) and flex (flexing and bending) abrasion. Durability may be measured as period of time (in operational life) or number of operational cycles.

Picture 608 is that of a brake shim treated with the same material as in picture 602 before (lower) and after (upper) the test cycles. The material in the tests applied in pictures 602, 608 fails the test because the piston has reached the rubber underlayer as indicated in the circled area 609. Picture 610 is that of a brake shim treated with the same durable material as in picture 606 before (lower) and after (upper) the test cycles. The material in the tests applied in pictures 606, 61 passes the test because the piston has not reached the rubber underlayer and filler sheen was observed after piston contact.

Figure 7A:
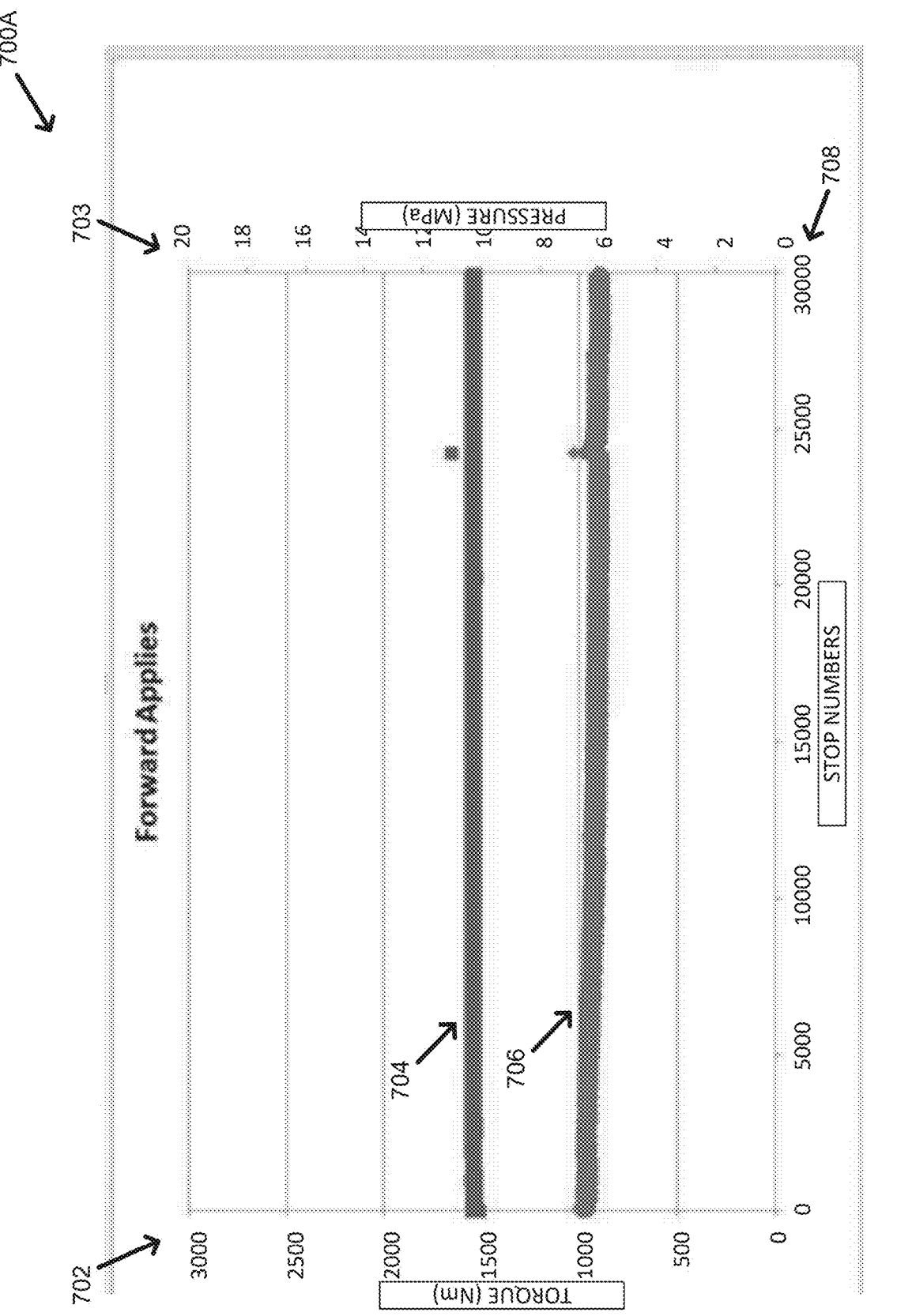
FIGS. 7A and 7B are diagrams illustrating maximum torque and pressure performances of an example DHFC material for forward brake applications and reverse brake applications.
Figure 7B:
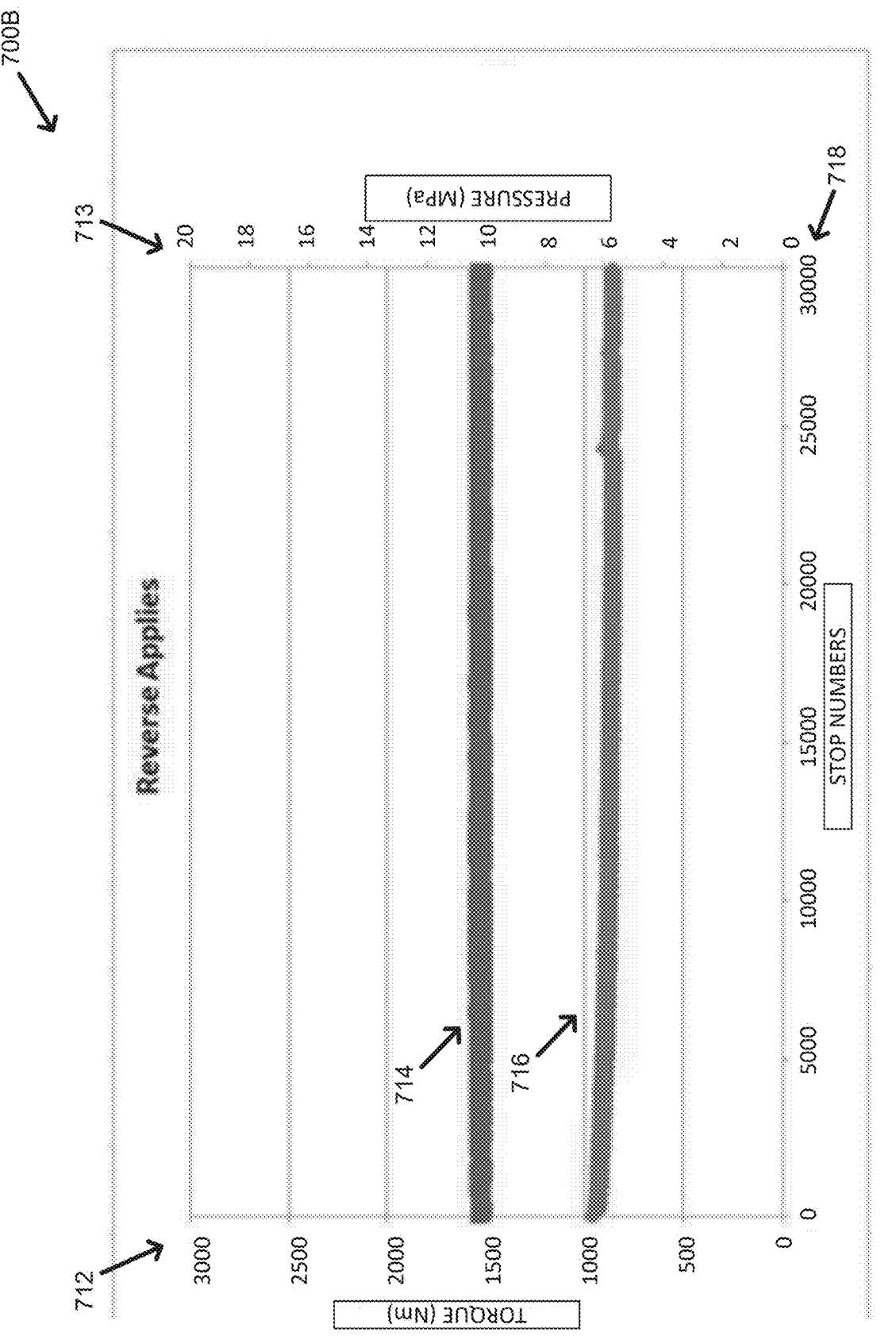

FIGS. 7A and 7B are diagrams illustrating maximum torque and pressure performances of an example DHFC material for forward brake applications and reverse brake applications, arranged according to aspects of the present disclosure.

Diagram 700A includes a graph, where the vertical axis 702 represents torque values in Nm, the vertical axis 703 represents pressure values in MPa, and the horizontal axis 708 represent number of stops employed in the tests. Plot 704 represents maximum torque for a DHFEC material according to examples (same material as in FIG. 6), and plot 706 represents maximum pressure for the DHFEC material according to examples. As the graph shows both maximum torque and pressure values are relatively stable for up to 30,000 forward brake applications.

Diagram 700B includes a graph, where the vertical axis 712 represents torque values in Nm, the vertical axis 713 represents pressure values in MPa, and the horizontal axis 718 represent number of stops employed in the tests. Plot 714 represents maximum torque for a DHFEC material according to examples (same material as in FIG. 6), and plot 716 represents maximum pressure for the DHFEC material according to examples. As the graph shows both maximum torque and pressure values are relatively stable for up to 30,000 reverse brake applications.

Figure 8:
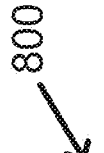
FIG. 8 is a flow chart illustrating a method for preparing an example DHFC, all arranged in accordance with at least some embodiments described herein.
Figure 8:
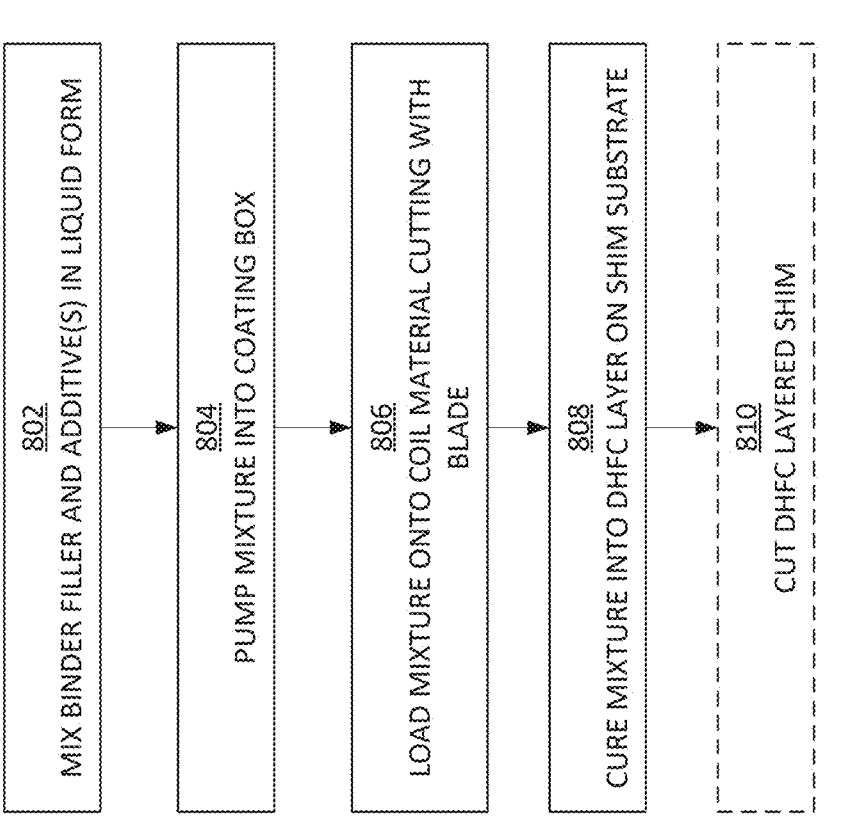

FIG. 8 is a flow chart illustrating a method for preparing an example DHFC, arranged according to aspects of the present disclosure.

The described method 800, may include block 802, "MIX BINDER FILLER AND ADDITIVE(S) IN LIQUID FORM", block 804, "PUMP MIXTURE INTO COATING BOX", block 806, "LOAD MIXTURE ONTO COIL MATERIAL CUTTING WITH BLADE", block 808, "CURE MIXTURE INTO DHFC LAYER ON SHIM SUBSTRATE", and optional block 810, "CUT DHFC LAYERED SHIM." At block 802, a binder such as phenoxy, polyurethane, melamine formaldehyde, bisphenol A epoxy, urea-formaldehyde, or acrylate copolymer, and a filler such as silicon carbide, (SiC), aluminum oxide ($Al_2O_3$), boron nitride (BN), or titanium dioxide ($TiO_2$), may be mixed with an additive such as an antifoam agent, an emulsifier, a pigment, a rheology modifier, or an adhesion promoter in liquid form with a solvent.

The liquid mixture from block 802 may be pumped into a coating box at block 804, and the viscous mixture may be loaded onto a coil material (metal substrate for shim) through a cutting blade at block 806. The blade may allow thicker coating. At block 808, the DHFEC layer on the shim substrate may be cured through a thermoset process and the DHFC layered shim substrates may be cut to shape at optional block 810 to form the shims. In case of elastomer and DHFC combination layers, the elastomer layer and the DHFC layer may be cured together providing additional durability and cost effectiveness.

EXAMPLES

The following examples are intended as illustrative and non-limiting and represent specific embodiments of the present disclosure. The examples show that the disclosed coatings have a high coefficient of friction, high durability, and ease of manufacturing.

Example 1

An aqueous solution of phenoxy by 80 weight % is mixed with SiC filler by 5 weight % and boron nitride (BN) filler by 10 weight %. The liquid mixture is mixed with an elastomer polymer by 4 weight % and a rheology modifier by 0.5 weight % and a silane additive by 0.5 weight %. The still liquid mixture is rolled over a stainless steel substrate of 0.400 mm thickness as a layer with a thickness of 0.025 mm. The DHFC layer is cured at 400° C. degrees. Next, an adhesive layer of 0.12 mm thickness is applied to the opposite surface of the stainless steel substrate. The stainless steel substrate with both surfaces treated is cut to shape to form brake shims.

Example 2

An aqueous solution of polyurethane is mixed with $Al_2O_3$ and the mixture further mixed with an antifoam agent and a rheology modifier. The viscous liquid mixture is loaded on a coil substrate and cut by a blade. The cut pieces are then cured under infrared light to form a DHFC layer of 0.016 mm thickness.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A durable high friction coating (DHFC) for a brake system, the DHFC comprising:
  one or more binders in a range from at least 70 weight % to less than 95 weight %, wherein the one or more binders comprise phenoxy in aqueous solution, polyurethane in aqueous solution form, melamine formaldehyde, bisphenol A epoxy, urea-formaldehyde, or a combination thereof;
  one or more fillers in a range from at least 5 weight % to less than 30 weight %;
  an elastomeric polymer in a range from at least 1 weight % to less than 8 weight %; and
  one or more additives in a range from at least 0.5 weight % to less than 2 weight %, wherein the one or more binders, the one or more fillers, the one or more additives, and the elastomeric polymer are mixed in liquid form and are cured into a layer of DHFC.

2. The DHFC of claim 1, wherein the one or more fillers comprise silicon carbide, (SiC), aluminum oxide ($Al_2O_3$), boron nitride (BN), titanium dioxide ($TiO_2$), or a combination thereof.

3. The DHFC of claim 1, wherein the one or more additives comprise a rheology modifier, an antifoam agent, a plasticizer, a pigment, an adhesion promoter, or a combination thereof.

4. The DHFC of claim 1, wherein a thickness of the layer of DHFC is in a range from about 0.020 mm to about 0.060 mm.

5. The DHFC of claim 1, wherein the layer of DHFC is formed on a layer of elastomer and the layer of DHFC and the layer of elastomer are cured together.

6. The DHFC of claim 5, wherein the layer of elastomer comprises synthetic polyisoprene, polybutadiene, chloroprene rubber, polychloroprene, neoprene, butyl rubber, halogenated butyl rubber, styrene-butadiene rubber, nitrile rubber, hydrogenated nitrile rubber, or a combination thereof.

7. The DHFC of claim 1, wherein the elastomeric polymer comprises synthetic polyisoprene, polybutadiene, polychloroprene, neoprene, or a combination thereof.

8. A brake shim comprising:
a metal substrate;
a first durable high friction coating (DHFC) layer deposited on a first surface of the metal substrate; and
a second DHFC layer or an adhesive layer deposited on a second surface of the metal substrate opposite the first surface, wherein the first and second DHFC layers comprise:
   one or more binders comprising phenoxy in aqueous solution, polyurethane in aqueous solution form, melamine formaldehyde, bisphenol A epoxy, urea-formaldehyde, or a combination thereof in a range from at least 70 weight % to less than 95 weight %;
   one or more fillers in a range from at least 5 weight % to less than 30 weight %;
   an elastomeric polymer in a range from at least 1 weight % to less than 8 weight %; and
   one or more additives in a range from at least 0.5 weight % to less than 2 weight %, wherein the one or more binders, the one or more fillers, the one or more additives, and the elastomeric polymer are mixed in liquid form and are cured to form the first and second DHFC layers.

9. The brake shim of claim 8, wherein a thickness of the metal substrate is in a range from about 0.350 mm to about 0.400 mm, and a thickness of the first and second DHFC layers is in a range from about 0.020 mm to about 0.060 mm.

10. The brake shim of claim 8, wherein the metal substrate comprises stainless steel, nickel, nickel-aluminum alloy, iron-nickel-chromium-molybdenum alloy, or a combination thereof.

11. The brake shim of claim 8, further comprising:
an elastomer layer deposited on the first surface or the second surface prior to deposition of the first or second DHFC layers, wherein the first or second DHFC layers are deposited onto the elastomer layer.

12. The brake shim of claim 11, wherein the first or second DHFC layers and the elastomer layer are cured together.

13. The brake shim of claim 8, wherein the metal substrate and the first or second DHFC layers are cut to shape to form the brake shim.

14. The brake shim of claim 8, wherein the one or more fillers comprise silicon carbide, (SiC), aluminum oxide ($Al_2O_3$), boron nitride (BN), titanium dioxide ($TiO_2$), or a combination thereof.

15. A method to manufacture a durable high friction coating (DHFC) for a brake system, the method comprising:
mixing a binder, a filler, an elastomeric polymer, and an additive in liquid form to form a mixture, wherein the binder comprises phenoxy in aqueous solution, polyurethane in aqueous solution form, melamine formaldehyde, bisphenol A epoxy, urea-formaldehyde, or a combination thereof and is in a range from at least 70 weight % to less than 95 weight %, the filler is in a range from at least 5 weight % to less than 30 weight %, the elastomeric polymer is in a range from at least 1 weight % to less than 8 weight %, and the additive is in a range from at least 0.5 weight % to less than 2 weight % in the mixture;
loading the mixture onto a coil material to form a layer of DHFC; and
curing the layer of DHFC on the coil material through heat treatment.

16. The method of claim 15, wherein mixing the binder, the filler, the elastomeric polymer, and the additive in liquid form comprises:
mixing, in a water-based media, the binder; the filler selected from silicon carbide, (SiC), aluminum oxide ($Al_2O_3$), boron nitride (BN), titanium dioxide ($TiO_2$), or a combination thereof; the elastomeric polymer; and the additive selected from a rheology modifier, an antifoam agent, a plasticizer, a pigment, an adhesion promoter, or a combination thereof.

17. The method of claim 15, wherein loading the mixture onto the coil material to form the layer of DHFC comprises:
loading the mixture onto the coil material using a blade; or
rolling the mixture onto the coil material using one or more rollers.

18. The method of claim 15, wherein curing the layer of DHFC through heat treatment comprises:
applying heated air, direct heat, or infrared heat to the layer of DHFC.

* * * * *